United States Patent
DiLorenzo et al.

(10) Patent No.: US 11,691,700 B2
(45) Date of Patent: Jul. 4, 2023

(54) SUBMERSIBLE ULTRASONIC RADIATING ELEMENTS FOR THE PREVENTION OF BIOFOULING

(71) Applicant: WAVEARRAY ANTIFOULING SYSTEMS, LLC, Naples, FL (US)

(72) Inventors: James DiLorenzo, Naples, FL (US); Sydney Innes, Fort Meyers, FL (US); Jake Levere, Naples, FL (US); Geoff Trager, Naples, FL (US)

(*) Notice: Subject to any disclaimer, the term of this patent is extended or adjusted under 35 U.S.C. 154(b) by 0 days.

(21) Appl. No.: 17/525,885

(22) Filed: Nov. 13, 2021

(65) Prior Publication Data

US 2022/0153394 A1    May 19, 2022

Related U.S. Application Data

(60) Provisional application No. 63/113,926, filed on Nov. 15, 2020.

(51) Int. Cl.
*B63B 59/04*     (2006.01)
*B63B 57/00*     (2006.01)

(52) U.S. Cl.
CPC ........ *B63B 59/04* (2013.01); *B63B 2057/005* (2013.01)

(58) Field of Classification Search
CPC ...... B63B 59/04; B63B 2057/005; C02F 1/36
See application file for complete search history.

(56) References Cited

U.S. PATENT DOCUMENTS

| | | | | |
|---|---|---|---|---|
| 3,524,027 A | * | 8/1970 | Schamp | H04R 1/021 381/152 |
| 4,922,468 A | * | 5/1990 | Menezes | A01K 61/00 116/22 A |
| 5,532,980 A | * | 7/1996 | Zarate | B63B 59/04 367/175 |
| 6,547,952 B1 | * | 4/2003 | Staerzl | B63B 59/04 204/196.01 |

* cited by examiner

*Primary Examiner* — Bayan Salone
(74) *Attorney, Agent, or Firm* — Andrew Morabito

(57) ABSTRACT

A bio-fouling transducer comprising: a housing comprising: a diaphragm a conduit attached to the diaphragm; and a cap attached to the conduit; a transducer element attached to the diaphragm within the conduit; a series of electrical connections electrically connected to the transducer; and at least one gasket attached to the transducer and in contact with the conduit.

12 Claims, 6 Drawing Sheets

SUBMERSIBLE ULTRASONIC RADIATING ELEMENTS FOR THE PREVENTION OF BIOFOULING

CROSS-REFERENCE TO RELATED APPLICATIONS

This application is a continuation-in-part (and claims the benefit of priority under 35 USC 120) of U.S. application No. 63/113,926 filed on Nov. 15, 2020, and U.S. application No. 63/113,929, filed Nov. 15, 2020. The disclosure of the prior applications is considered part of (and is incorporated by reference in) the disclosure of this application.

BACKGROUND OF THE INVENTION

The present invention relates to an apparatus for preventing aquatic biological growth on submerged structures and/or biological fouling in water (e.g., fouling organisms found in ship ballast tanks). The present invention also relates to a device for this purpose.

The settlement and growth of fouling organisms such as barnacles and algae have long plagued both commercial and recreational boaters. The colonization of submerged manufactured surfaces by these organisms is referred to as "fouling" as they increase the organism are dangerous and destructive to the structures. In addition, fouling is prevalent and widespread on marina pilings, and other structures. On fixed structures, fouling increases weight and structural loading.

Various methods have been used to attempt to limit boat fouling, such as anti-fouling paints, the use of copper electrodes to release copper into the water and use of chlorine generation to release chlorine into the water. In general, these techniques function by releasing toxic chemicals into the water surrounding a boat thus preventing the settlement and subsequent growth of barnacles as well as other forms of marine, brackish, and freshwater life. However, the use of these methods obviously creates a negative environmental impact affecting fish-life and in turn fish food and humans and poses a serious threat to the health of the world oceans and other bodies of water due to the toxicity of chemicals employed. Several states in the U.S. have now banned the use of certain anti-fouling agents and other countries of the world have joined in a similar ban.

Each of these anti-fouling methods as now practiced have problems discovered by the present inventors and resolved by their invention. As a result, many boaters have resorted to installing expensive lifts to remove their boats from the water in areas such as Florida, where year-round boating is common. For larger boats (e.g., over 35 feet), lifts are often not practical or affordable. And in many places worldwide, lifts are not commonly used due to seasonal boating activities.

In consideration of the current existing anti-fouling methods and practices, which include primarily the application of toxic bottom paints to boats and labor intensive, repetitive manual cleaning of fouled surfaces, both of which are only partially effective and provide short-term protection only, it is evident there remains the need for a system that incorporates the attributes of affordability, long-term consistent fool proof operability, dependability and effectiveness, as well as being safe for the environment.

SUMMARY

In a first embodiment, the present invention is a bio-fouling transducer comprising: a housing comprising: a diaphragm a conduit attached to the diaphragm; and a cap attached to the conduit; a transducer element attached to the diaphragm within the conduit; a series of electrical connections electrically connected to the transducer; and at least one gasket attached to the transducer and in contact with the conduit.

In a second embodiment, the present invention is a bio-fouling transducer comprising: a conduit having a first end and second end; a cap secured to the first end of the conduit; a diaphragm secured to the second end of the conduit, wherein the cap and the diaphragm form a substantially watertight seal with the conduit and an interior chamber is formed; and a first transducer element secured to the diaphragm within the conduit.

In a third embodiment, the present invention is a bio-fouling transducer comprising: a conduit having a first end and second end with at least one chamber; a cap secured to the first end of the conduit; a diaphragm secured to the second end of the conduit, wherein the cap and the diaphragm form a substantially watertight seal with the conduit and at least one sealed chambers are formed; and at least one transducer element secured to the diaphragm within the conduit within each of the at least one sealed chambers.

DETAILED DESCRIPTION OF THE INVENTION

Figure 1:
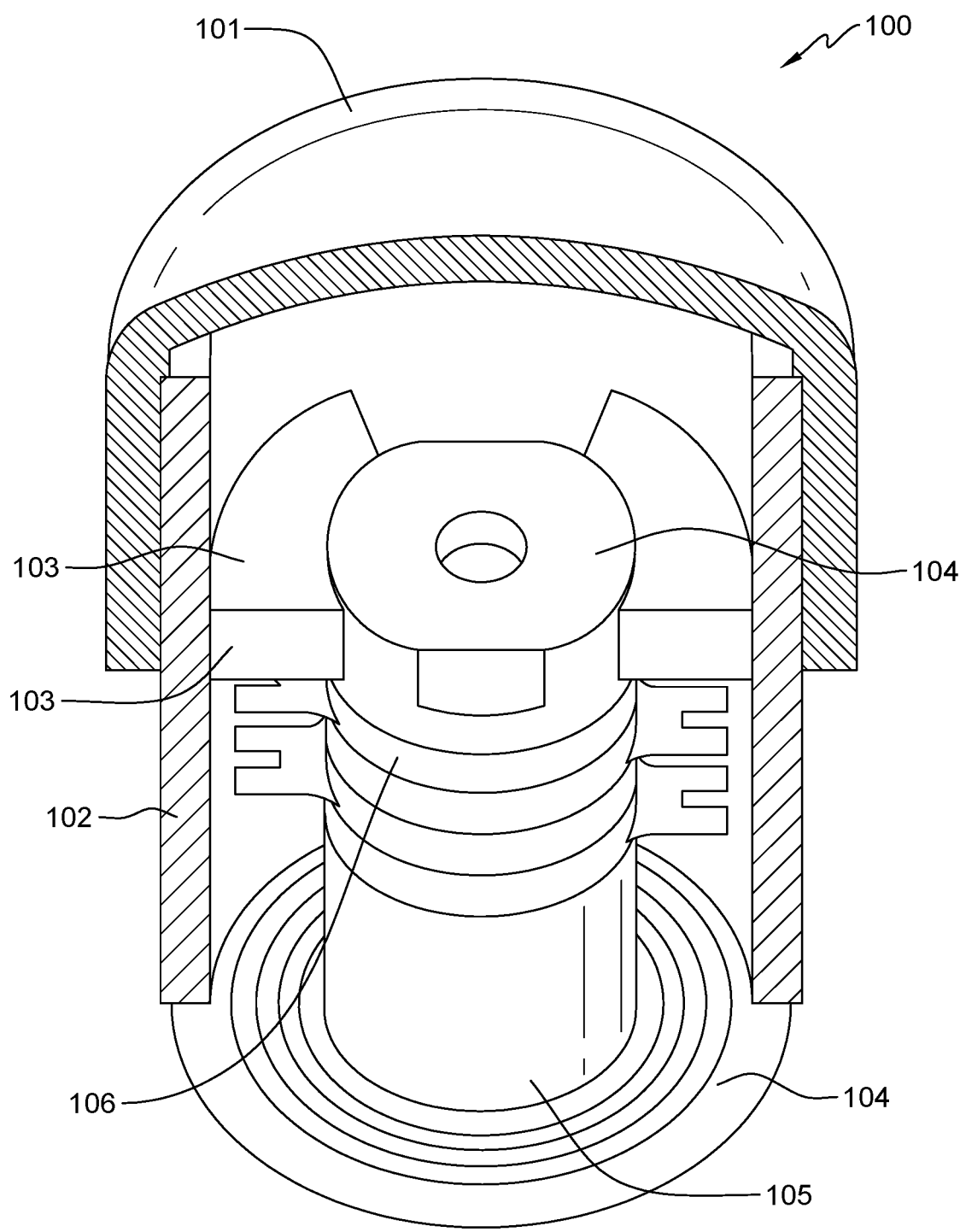
FIG. 1 depicts a section view of a transducer, in accordance with one embodiment of the present invention.

The present invention provides a non-toxic, environmentally beneficial anti-fouling transducer. The present invention may prevent the fouling organism from growing, reducing the growth rate of the fouling organisms, may remove the fouling organisms from the structure, or a combination of these. Aspects of the present invention improve the effectiveness and reliability of systems employing sound energy to reduce or prevent marine, brackish, and freshwater fouling on submerged structures. This invention makes use of a systems approach to generate, monitor, and control sound pressure near and around the submerged structures which are colonized by fouling organisms, by creating a vibrational energy field. This allows the submerged surface of a submerged surface to remain free of fouling organisms in any aquatic environment.

Several issues must be considered when designing submersible housings for ultrasonic transducers. The housing material must be durable and corrosion resistant, and there must exist a way to seal the housing that is resistant to vibration. Any adhesives or cements used to attach the transducer to the diaphragm must not be electrically conductive, show minimal resistance to ultrasonic energy transmission, and not prove too brittle to crack at high vibration frequencies. The methods of attaching the ultrasonic transducer to the housing itself also proves important, as care must be taken such that it does not impede the operation of the transducer.

The entire diverse and complex community of fouling organisms that settle and grow on ship surfaces, ranging from the tiniest micro-organisms (bacteria and algae) to the larger invertebrate larvae (barnacles, mussels, tunicates, bryozoans . . . etc.) can be targeted by delivering protective sound energy over the broad band of frequencies required to ensure maximum effectiveness on organisms differing widely in size. The sonic irradiations can be maintained continuously within optimum functional ranges for the entire suite of fouling community organisms with a concurrently operating monitoring, feedback, and adjustment system.

The present invention also provides the advantage of protecting submerged structures (e.g., pier pilings) from ship worms, barnacles, mussels, algae, and other fouling organisms. Through a modular and easily reconfigured system, the present invention provides an advantage of being highly customizable based on the intended application. The present approach entails the utilization of various sensors for autonomously and adaptively controlling an array of transducers or array of arrays of transducers. Also, the inventive system can be used to keep water intake pipes of power plants and other operations free of serious pest organisms like zebra mussels (*Dreissena polymorpha*) which settle inside and outside the pipe the pipe, grow rapidly, and clog such pipes. This prevents the environmentally damaging introduction and spread of exotic, invasive fouling organisms to new waters when ballast water is released. Invasive species are now considered a major threat to the health of world ocean ecosystem stability and biodiversity.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

The present invention is disclosed in a first embodiment depicted in FIG. 1, in accordance with one embodiment of the present invention.

The transducer 100 is comprised of a housing, and the transducer element. The housing consists of a diaphragm 104, a conduit 102, and a cap 101. The conduit 102 is a cylindrical element with an open top and bottom end and of a predetermined length. The conduit 102 can be made from any material metal or plastic that is able to withstand the stresses created by the transducer element and withstand the environment in which the transducer 100 is used in. The cap 101 is designed to cover a top end of the conduit 102 and create a substantially watertight seal. In some embodiments the cap 101 and the conduit 102 are a single component.

Figure 2:
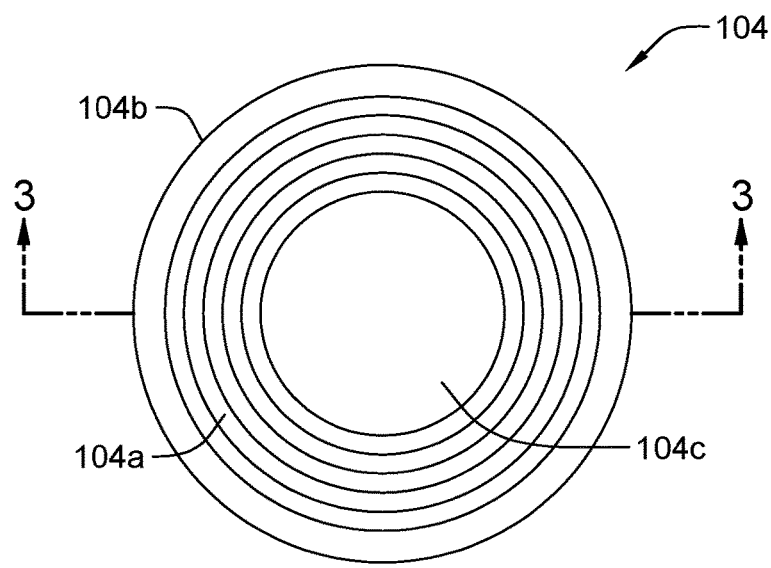
FIG. 2 depicts a top view of a diaphragm, in accordance with one embodiment of the present invention.
Figure 3:
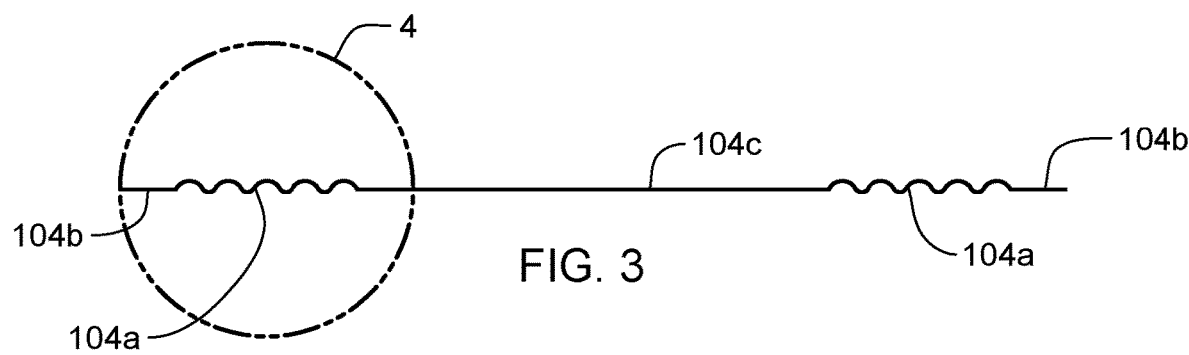
FIG. 3 depicts a side view of the diaphragm, in accordance with one embodiment of the present invention.
Figure 4:
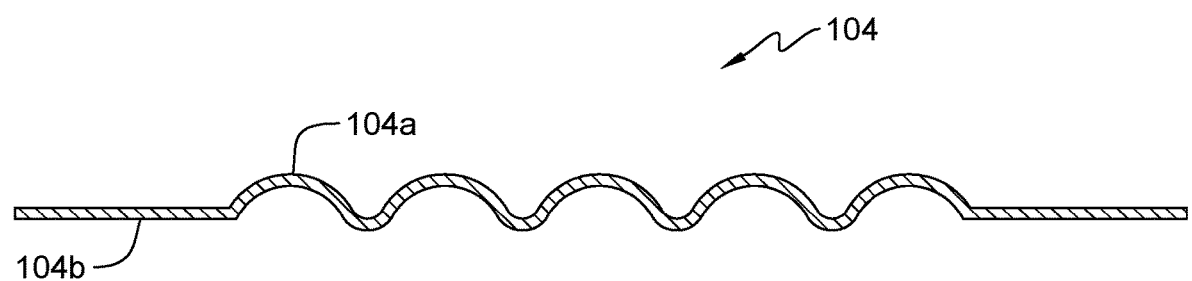
FIG. 4 depicts a section view of the diaphragm, in accordance with one embodiment of the present invention.

The diaphragm 104 is secured to the other end of the conduit 102 and forms a watertight seal with the conduit 102, wherein an interior watertight compartment is formed. The diaphragm 104 is secured to the conduit 102 by an adhesive material that is able to withstand the vibration produced by the transducer element 105. The diaphragm 104 as shown in FIGS. 2, 3, and 4 has an outer rim 104*b* which is sized and designed to be a similar thickness as the conduit 102. Interior section 104*c* is sized to receive the transducer element 105. Ribbed section 104*a* extends from the outer rim 104*b* and the interior section 104*c*. The ribbed section 104*a* is designed with a predetermined curvature and repetition of the ribs based on the transducer properties and the overall design of the transducer 100, as well as the desired features of the transducer. The diaphragm 104 may be comprised of several layers of material. In some embodiments, the diaphragm is 0.08 mm thick. As shown in the section view FIG. 4, the ribbed section 104*a* is comprised of a series of continuous curves of substantially similar radii. In additional embodiments, the curvature of each rib (and the radius) may be different.

Contained within the housing is the transducer element 105 which is attached to the diaphragm 104 through the use of an adhesive material which is able to handle the stresses produced by the transducer element 105. The adhesive material forms an attachment layer between the transducer element 105 and the diaphragm 104. Secured to the transducer is a series of connectors 106 for the wires which provide the power and the control for the transducer element 105. These connectors 106 provide for the flow of electricity to the transducer element 105. The size and capacity of the connectors 106 is based on the requirements of the transducer element 105 to operate at the desired levels. At least one gasket 103 is secured to the transducer element 105, wherein the gasket 103 is used for structural integrity of the transducer element 103 within the conduit 102. In the depicted embodiment two gaskets 103 are present. In additional embodiments there may be more gaskets, and the positioning of the gasket may be shifted about the connectors 106 and the transducer element 105.

Figure 5:
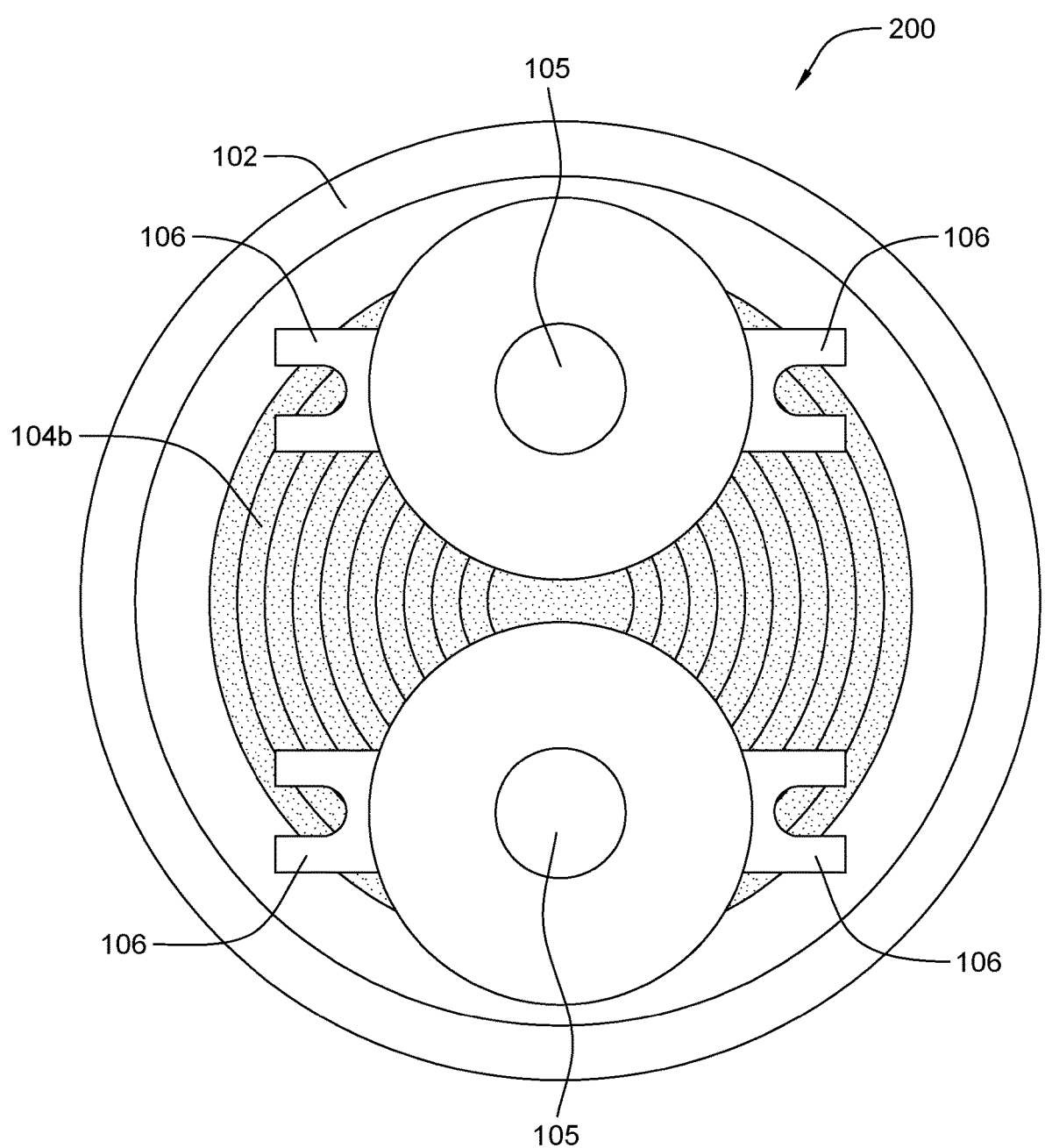
FIG. 5 depicts a top view of a transducer, in accordance with another embodiment of the present invention.
Figure 6:
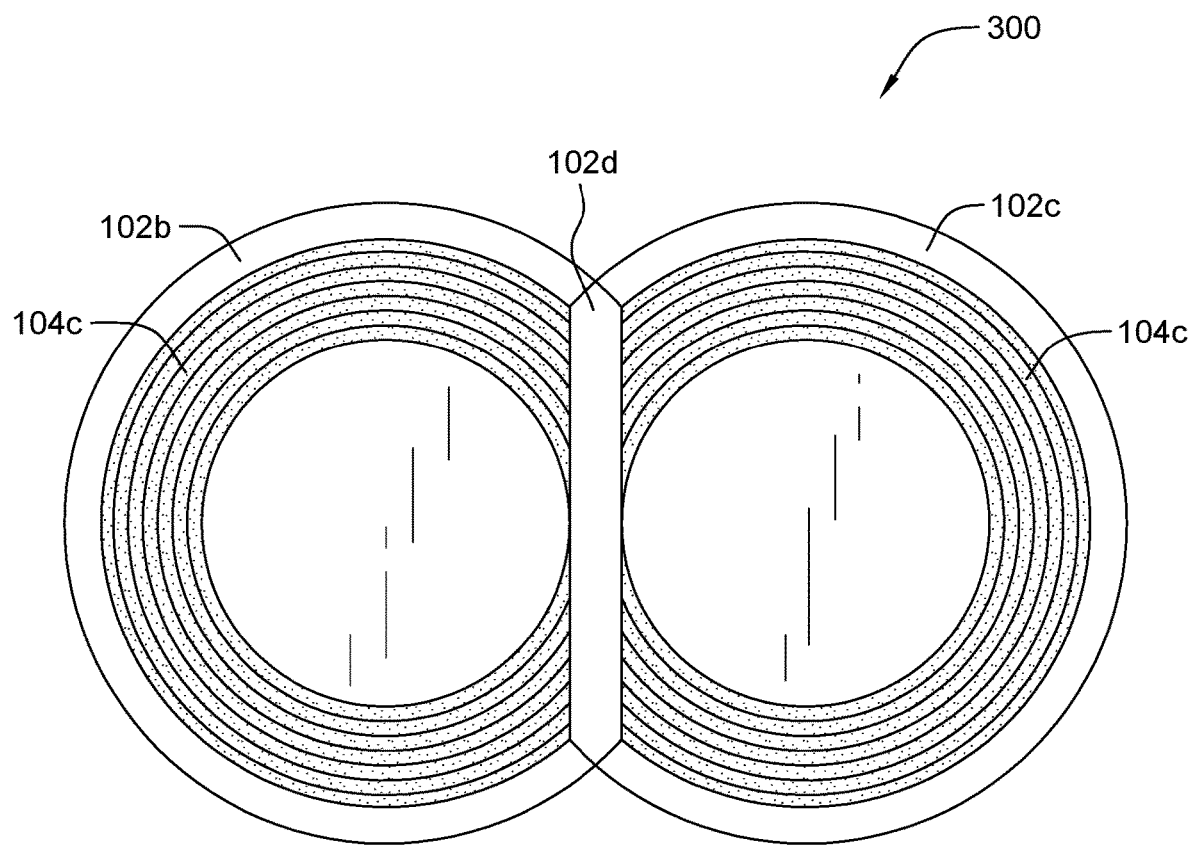
FIG. 6 depicts a top view of a transducer, in accordance with another embodiment of the present invention.
Figure 7:
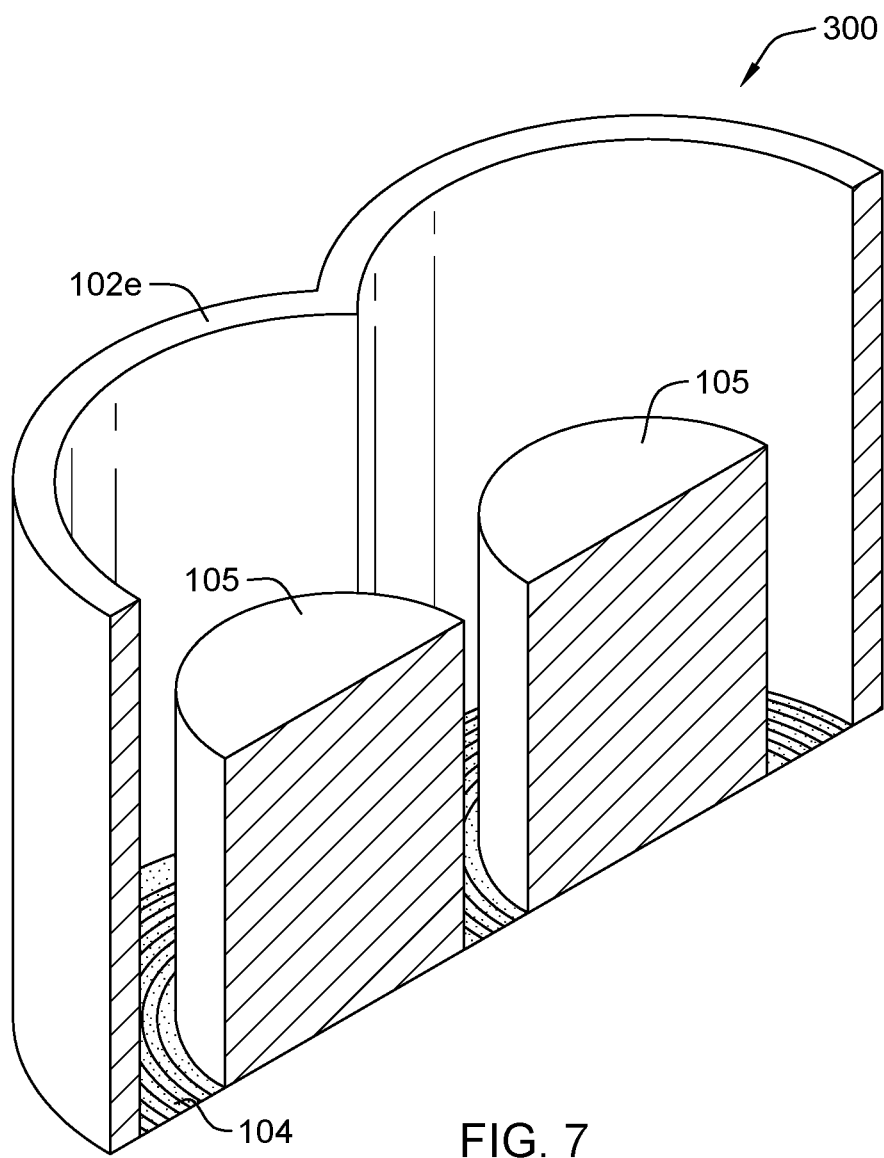
FIG. 7 depicts an isometric view of a transducer, in accordance with another embodiment of the present invention.

As depicted in FIGS. 5, 6, and 7 are additional embodiments of the transducers 200 and 300 designs. As shown in FIG. 5, there are two transducer elements 105 positioned within the conduit 102, and the diaphragm 104B is redesigned so the ripped section 104*a* does not interfere with the transducer elements 105, where the transducer elements 105 would attach or connect with the diaphragm 104B. In additional embodiments, there may be a differing numbers of transducer elements 105 within the housing and the diaphragm 104B would be redesigned to accommodate each transducer element 105. As shown in FIG. 6 is another embodiment, wherein the conduit is comprised of sections 102B 102C, and divider 102D and a transducer element 105 is installed within each of the formed sections. The diaphragm 104C is designed to fit within the modified conduit. In these embodiments, arrays of transducers are formed. In additional embodiments, the conduit 102 can be designed to have any number of transducer elements 105 within separate housings. In FIG. 7, an additional embodiment is shown, wherein the conduit 102E is shown with a single diaphragm 104 that has an attachment point for each of the transducer elements 105

The proposed novel approach entails the utilization of multiple transducer elements 105 in a single housing designed for marine environments and for increasing the distance of desired sound pressure levels. This novel approach can be implemented through a design that accommodates multiple diaphragm 104 substrates or a single diaphragm substrate. A transducer element 105 is shown having two transducer elements 105 contained within a single circular housing. Each transducer element 105 is connected to the same diaphragm. In some embodiments, a transducer element 105 is shown where the housing of the transducer element 105 has two separate compartments, each with a single transducer element 105 and each with its own independent diaphragm 104. A transducer element 105 is shown where a single housing has one internal compartment where two transducer elements 105 are present and each transducer element 105 has a distinct diaphragm 104.

Utilizing multiple transducer elements 105, an advantage of the constructive interference that occurs can be used. This can be utilized to potentially double the pressure amplitude affects compared to that of a single emitting source. It can be shown by both simulation and experimentally that individual transducer elements 105 placed at the proper distances and as close as possible to one another, can add to their collective pressure amplitudes constructively. A greater constructive interference can be achieved by placing two or more transducer elements 105 in the same housing structure with two separate diaphragms and a rigid divider to ensure independent ultrasonic vibration.

With a single diaphragm 104, the ability to take advantage of the constructive interference is lost. However, utilizing multiple transducer elements 105 to vibrate a single substrate can in potentially increase the total amount of ultrasonic energy within in the system and increase the sound pressure amplitudes through a single emitting sound-wave source. The design for a specialized diaphragm and housing would have to accommodate the additional number of transducer elements 105 to ensure unison ultrasonic vibration occurs without impeding each other's motion.

The transducers are devices that are able to convert electrical waveforms into acoustic waves. The transducers, which can be constructed of piezoelectric transducers, of either ceramic crystalline type, or film organic material type. Each transducer has the ability to vary the amplitude, frequency, volume, wave form, and sound-delivery pattern response. In some embodiments, wave frequency may range from approximately 20 kHz to about 80 kHz. However additional wave frequency ranges are possible based on the transducer design and the limitations of the individual elements within the transducer. Depending on the organisms (type, size, and settlement location), different sound waves may provide a more efficient and effective anti-fouling ability of the transducers. Through electrical impulses received from a wave form generator 105, the fluctuating voltage applied across the transducer causes a crystal to expand and contract, which in turn causes oscillation at a frequency determined by the waveform generator 105. In some embodiments, the distance between the center of the transducers 104 can be adjusted to a half wavelength of the frequency of operation or 0.5 kHz value. The crystal used in the transducer may be but not limited to, berlinite, quartz, tourmaline, salt, and the like which would be acceptable to use in a submerged environment. This voltage fluctuation in turn produces a mechanical (e.g., up-and-down) vibration of a surface of the transducer, causing sound waves to propagate through the environment.

The mechanical sound waves travelling from the transducer consist of moving bands of compressed fluid (high pressure) alternating with bands of rarified or expanded fluid (low pressure). If the pressure differential between the compressed and rarified zones is great enough and occurs rapidly enough (i.e., if the sound is "loud" enough and the frequency is high enough), cavitation occurs. Cavitation is the formation of micro-bubbles from dissolved gases in a travelling rarified fluid band of the sound wave, followed by rapid compression of the bubbles to the point of implosion by the compressed fluid band that comes after the rarified one. The imploding bubbles cause shock waves and violent molecular motion of air or water on a micro-scale. If cavitation occurs right at the surface of a solid submerged object (e.g., boat hull or submerged structure) the high energy shock waves and extreme micro-turbulence make it substantially impossible for fouling organisms (e.g., tiny barnacle larvae, microscopic algae spores) to attach. These oscillations may be subsonic, audible, ultrasonic, or mega sonic frequencies. The transducers are able to be electronically steered similar to that of a phased array. Wherein the direction of the sound waves generated by the transducers are shifted the phase of each transducer to redirect the sound wave. In some embodiments, the transducers have the ability to shift the sound wave 45 degrees from center to either +45 degrees or −45 degrees from center. Wherein center is perpendicular to the forward face of the transducer. In embodiments, where the transducers are able to be electronically steered, a phase shifter is integrated into the transducers or may be incorporated as an independent component in the system.

The transducers maybe, but not limited to a piezoelectric ceramic transducer, or other types of transducers which are able to operate in a submerged environment.

The transducers are designed to operate with a low voltage supply. In one embodiment, that is a voltage has a pike of a hundred (100) voltage or a root mean square voltage of approximately thirty-five (35) volts. In additional embodiments, the low voltage supply may be higher or lower based on the intended operation and size of the system 100. This low voltage provides the benefit of reducing operating energy demand, the risk of injury to humans or wildlife in the water, and also reduce the likelihood of damage to the structure. The voltage of the transducers is based on the electrical impedance of that transducer. The electrical impedance is determined by both the mechanical resistance presented to the transducer from its environment, e.g., materials on the transducer face, materials used to make a housing, whether it is operating in air or water or some other material such as the fiberglass of a boat hull, or epoxies or other adhesives use to make acoustic windows for a housing. In one embodiment, the transducers are comprised of a transducer mounted (e.g., with epoxy) to a thin flexible diaphragm. The diaphragm with the transducer was then mounted in a housing that accommodates the exact size of the diaphragm on a "lip" and the diaphragm and transducer are sealed within the waterproof housing. In some embodiments, the diaphragm is one millimeter thick. In some embodiments, the transducers produced an impedance of 200 Ohms to 500 Ohms with this low voltage.

The transducer has a durable, water-proof housing, that has minimal impedance to the transmission of ultrasound through the fluid so that cavitation is induced at the target location. The direction and area of coverage of the transducer is determined by the size, shape, contour, and overall design. Depending on the application various sizes of transducers may be used.

Additionally, the design of the transducers affects the distance at which the transducers are operational. In one embodiment, the transducers are designed to be effective at preventing fouling of the structure from one meter away.

While this invention has been described in conjunction with the specific embodiments outlined above, it is evident that many alternatives, modifications, and variations will be apparent to those skilled in the art. Accordingly, the preferred embodiments of the invention, as set forth above, are intended to be illustrative, not limiting. Various changes may be made without departing from the spirit and scope of this invention.

The present invention has been described in the foregoing on the basis of several preferred embodiments. Various aspects of different embodiments are deemed described in combination with each other, wherein all combinations which can be deemed by a skilled person in the field as falling within the scope of the invention on the basis of reading of this document are included. These preferred embodiments are not limitative for the scope of protection of this document. The rights sought are defined in the appended claims.

What is claimed is:

1. A bio-fouling transducer comprising:
    a housing comprising:
    a diaphragm;
    a conduit attached to the diaphragm, wherein a shock absorbent adhesive element is used to secure the diaphragm to the conduit and the transducer element and is substantially waterproof; and
    a cap attached to the conduit;
        a transducer element attached to the diaphragm within the conduit;
        a series of electrical connections electrically connected to the transducer;
        at least one gasket attached to the transducer and in contact with the conduit.

2. The bio-fouling transducer of claim 1, wherein the diaphragm consisting of an outer section, a corrugated section, and an inner section.

3. The bio-fouling transducer of claim 2, wherein the outer section is sized to substantially the same thickness as the conduit and is substantially flat.

4. The bio-fouling transducer of claim 2, wherein the inner section is sized to substantially the same diameter as the transducer element and is substantially flat.

5. The bio-fouling transducer of claim 2, wherein the corrugated section has a predetermined profile based on the transducer element.

6. The bio-fouling transducer of claim 2, wherein the corrugated section has a wave like profile, wherein the wave height is substantially the same for each crest and trough of the wave like profile.

7. A bio-fouling transducer comprising:
    a housing comprising:
    a diaphragm, wherein the diaphragm consisting of an outer section, a corrugated section, and an inner section;
    a conduit attached to the diaphragm; and
    a cap attached to the conduit;
        a transducer element attached to the diaphragm within the conduit;
        a series of electrical connections electrically connected to the transducer;
        at least one gasket attached to the transducer and in contact with the conduit.

8. The bio-fouling transducer of claim 7, wherein the outer section is sized to substantially the same thickness as the conduit and is substantially flat.

9. The bio-fouling transducer of claim 7, wherein the inner section is sized to substantially the same diameter as the transducer element and is substantially flat.

10. The bio-fouling transducer of claim 7, wherein the corrugated section has a predetermined profile based on the transducer element.

11. The bio-fouling transducer of claim 7, wherein a shock absorbent adhesive element is used to secure the diaphragm to the conduit and the transducer element and is substantially waterproof.

12. The bio-fouling transducer of claim 7, wherein the corrugated section has a wave like profile, wherein the wave height is substantially the same for each crest and trough of the wave like profile.

* * * * *